(12) United States Patent
Heismann

(10) Patent No.: US 6,249,938 B1
(45) Date of Patent: Jun. 26, 2001

(54) CABLE LENGTH ADJUSTMENT DEVICE

(75) Inventor: Richard A. Heismann, Jackson, TN (US)

(73) Assignee: Murray, Inc., Brentwood, TN (US)

( * ) Notice: Subject to any disclaimer, the term of this patent is extended or adjusted under 35 U.S.C. 154(b) by 0 days.

(21) Appl. No.: 09/362,086

(22) Filed: Jul. 28, 1999

(51) Int. Cl.[7] .............................. A44B 11/25; A44B 13/00
(52) U.S. Cl. .............................. 24/580; 24/16 R; 24/586; 24/697.1; 24/697.2; 403/208; 403/209; 403/353
(58) Field of Search .................................. 403/294, 208, 403/209, 210, 303, 353; 24/16 R, 580

(56) References Cited

U.S. PATENT DOCUMENTS

| 518,880 | 4/1894 | Evans . |
|---|---|---|
| 2,781,212 | 2/1957 | Jugle . |
| 3,011,818 | 12/1961 | Matthiessen . |
| 3,752,204 | 8/1973 | Ouellette . |
| 4,615,368 | 10/1986 | Nestlen . |
| 4,872,626 | 10/1989 | Lienart . |
| 5,336,846 | 8/1994 | Sachs . |
| 5,409,330 | 4/1995 | Naines et al. . |
| 5,634,379 | 6/1997 | Bernard . |

*Primary Examiner*—Anthony Knight
*Assistant Examiner*—Ernesto Garcia
(74) *Attorney, Agent, or Firm*—Pillsbury Winthrop LLP

(57) ABSTRACT

A retaining member is secured to a cable at a distance from one end of the cable. The retaining member includes a plurality of fitting receivers spaced from the cable end by different distances. A fitting is provided at the cable end. By selectively engaging the fitting with the fitting retainers, the effective length of the cable can be changed over an adjustment range.

3 Claims, 2 Drawing Sheets

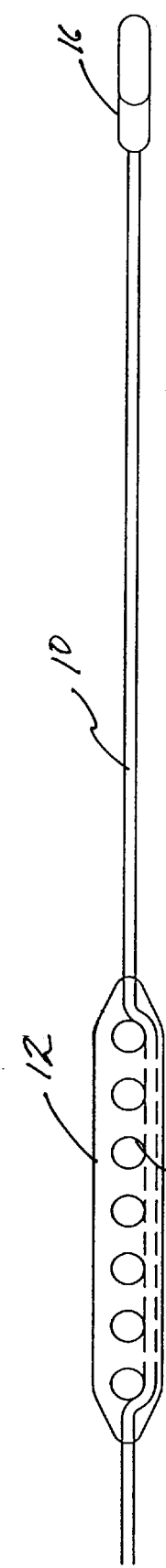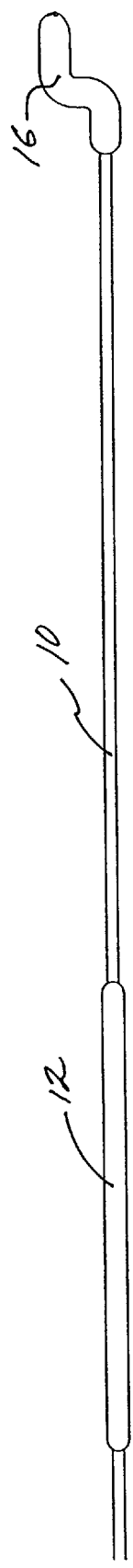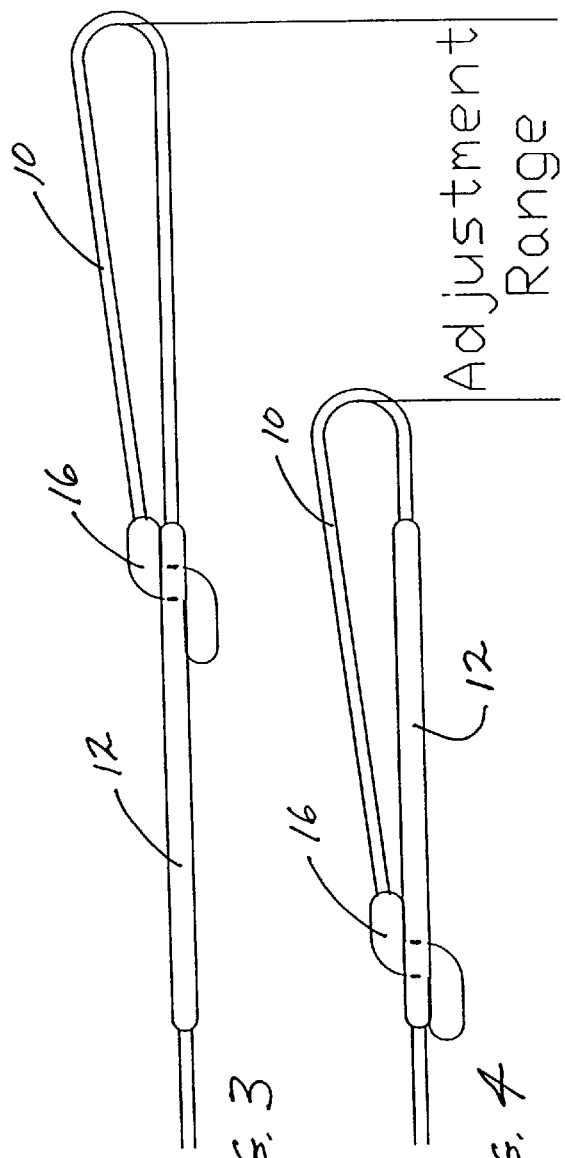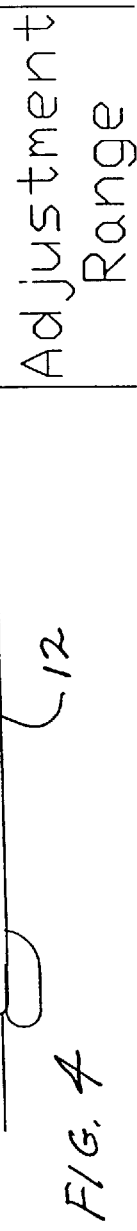

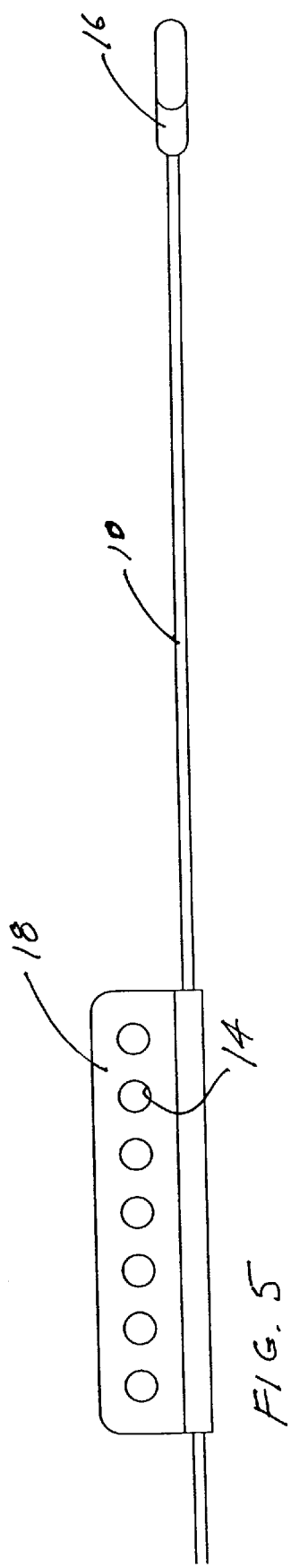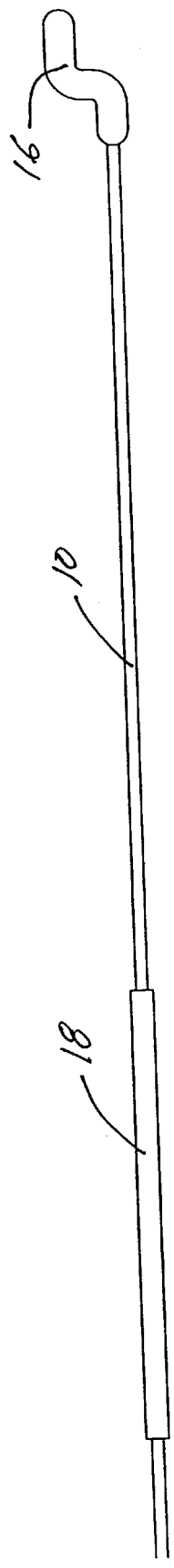

CABLE LENGTH ADJUSTMENT DEVICE

BACKGROUND OF THE INVENTION

1. Field of the Invention

The present invention relates to a device which permits the effective length of a flexible cable to be adjusted over a desired range.

2. Prior Art

Devices are known which can be secured to a flexible cable or rope intermediate its ends to cooperate with a free end of the cable or rope to adjust the effective length thereof. One such device is disclosed in U.S. Pat. No. 3,752,204, wherein a plurality of abutment elements are secured to a cable in spaced relationship along the cable intermediate its ends. A retaining element is joined to an end of the cable. By selectively joining the retaining element to one of the abutments, the effective length of the cable can be chosen.

SUMMARY OF THE INVENTION

The present invention provides a simplified cable length adjustment device wherein a retaining member is secured to a flexible cable intermediate the ends of the cable. The retaining member is oriented lengthwise of the cable and is provided with a number of openings along its length. One end of the cable is provided with a fitting adapted to be received and releasably locked in the openings. By appropriate selection of a particular opening for receiving the fastener, a desired effective length of cable can be obtained over an adjustment range.

BRIEF DESCRIPTION OF THE DRAWINGS

The invention will be described in greater detail with respect to the accompanying drawings, wherein:

FIG. 1 is a side elevational view of a first embodiment of a cable length adjustment device according to the present invention;

FIG. 2 is a top plan view thereof;

FIG. 3 is a side elevational view wherein a first effective cable length is obtained with the device illustrated in FIG. 1;

FIG. 4 is a side elevational view wherein a second effective cable length is obtained with the device illustrated in FIG. 2;

FIG. 5 is a side elevational view of a second embodiment of a cable length adjustment device according to the present invention; and FIG. 6 is a top plan view of the embodiment shown in FIG. 5.

DETAILED DESCRIPTION OF PREFERRED EMBODIMENTS OF THE INVENTION

Although the invention is particularly suitable for use with flexible metallic cable and will be so described hereinafter, it will be understood that it is equally applicable to adjusting the effective length of other flexible products, such as rope. Therefore, the term "cable" is intended to contemplate lengths of stranded and unstranded metallic and non-metallic materials.

Referring to FIGS. 1 and 2, a length of flexible cable 10 is shown. A retaining member 12 is secured to the cable intermediate its ends. More particularly, member 12 is secured to the cable at a distance from one of its ends which will permit a desired range of cable length adjustments, as hereinafter to be described.

Member 12 extends along the length of the cable and is provided with a plurality of spaced openings 14 along its length. A free end of the cable is provided with a fitting 16 adapted to be received and releasably locked in a selected opening 14. As shown in FIG. 2, fitting 16 is a Z-shaped element secured to the end of the cable.

To adjust the effective length of the cable, fitting 16 is inserted into an opening 14 of member 12 to form a loop at the end of the cable. As can be appreciated from FIGS. 3 and 4, depending on which of the openings is selected, the loop size varies thereby changing the effective length of the cable over the adjustment range illustrated.

In the embodiment shown in FIGS. 1 and 2, the retainer member 12 preferably is cast metal secured to cable 10 by fasteners (not shown), or by an appropriate swage or weld. In the embodiment of FIGS. 5 and 6, however, retainer member 18 is a stamped product which is crimped onto cable 10 to secure it in a fixed position on the cable. Otherwise, member 18 is substantially identical in design and function to the previously described retainer member 12.

Although the retainer members 12 and 18 have been described as being metallic, it will be understood that they may be formed from non-metallic materials having strength characteristics appropriate to the particular application contemplated for them.

What is claimed is:

1. A cable length adjustment device, comprising:
    a retaining member secured to a cable at a location spaced from opposite ends of the cable, said member extending substantially along the length of the cable;
    a fitting secured to one end of the cable; and
    a plurality of openings positioned in spaced relationship along the retaining member at different distances from said one end, each opening being dimensioned to receive the fitting whereby when the fitting is received in any one of the openings, a loop is formed in the cable between said one end and the location of the retaining member.

2. A device according to claim 1, wherein said fitting is configured to be received and releasably locked within said fitting receivers.

3. A device according to claim 2, wherein said fitting is substantially Z-shaped.

* * * * *